Patented July 3, 1928.

1,676,121

UNITED STATES PATENT OFFICE.

RICHARD VON DER HEIDE, OF SCHWIEBUS, GERMANY.

PROCESS OF TRANSFORMING PIECES OF CURDS INTO CHEESE BY TREATMENT WITH SALTS.

No Drawing. Application filed May 25, 1926, Serial No. 111,623, and in Germany May 12, 1925.

It is known to treat pieces of curds with salts or mixtures of salts in order to accelerate their transformation into cheese. It is also known to add fungi to pieces of curds. Heretofore, however, this has always been done only for the purpose of giving to the cheese a certain taste or flavor.

The salts which have so far been used for accelerating the process of maturing, have exclusively been of inorganic nature. It is probably due to this fact, that the maturing process of curds, which have thus been treated, requires an extremely long time, which is not compatible with the present commercial and economical conditions.

This disadvantage is obviated by the process according to this invention. This process consists therein, that the several pieces of curds are treated with a mixture of bacteria, salts and compounds of the ammonium-groups as well as the amide- and amine-groups such as for instance amides, amines, amino-acids, albumin bodies and the waste products of these substances. The new process according to this invention may be carried out in a number of modifications. Thus, for instance, the above-mentioned mixture may be added to the curds in solid or liquid form or also in the form of a solution. For definite kinds of cheese it may be advantageous to cover the surface of the formed piece of curds with said mixture. Instead thereof, however, also the formed pieces of curds may be washed over with a solution of the mixture. Another modification of the new process consists therein, that the formed pieces of curds are treated or stored up in a space which contains besides the specific fungi also gases or vapors of the salts and nitrogene-compounds. In order to completely control the process of maturing, according to this invention several of the described modifications of the process may be combined with each other. In this manner it may be of advantage to wash over the pieces of curds, after the mixture had been added, with a solution of mixture or to store the same up in the space which contains the above-mentioned bacteria, gases and vapors. It may likewise be of advantage to employ the one or the other process alternately.

Experiments have proven that a very quick maturing of the pieces of curds may also be attained in case the same are only treated with a mixture of salts and compounds of the ammonium-groups etc. Such a process of treatment will especially be sufficient, if in the dairy-works the required bacteria are already present in the air.

A mixture, which is especially suitable for the treatment of pieces of curds according to this invention consists of the following:

| | Per cent. |
|---|---|
| Amino-acids | 50 |
| Common salt | 40 |
| Chloride of magnesia | 4 |
| Phosphate of calcium | 4 |
| Iron salts | 1 |
| Manganese salts | 1 |
| | 100 |

With this mixture the pieces of curds are treated in the one or the other above-described manner. Instead of amino-acids the amides or other albumin bodies, such as, for instance, gelatine may be used in the same ratio. Still greater advantages are obtained, if a definite bacteria culture in the quantity of 1% is added to this salt preparation. The kind of the bacteria culture depends on the special kind of cheese which shall be brought to maturity.

It has been found, that a mixture for treating the pieces of curds is especially suitable, which consists mainly of carbonate of ammonium, lactate of ammonium and chloride of ammonium. The treatment with such a mixture is preferably carried on at a temperature of 15 to 30° centigrade.

I claim:—

1. A process for quickly transforming pieces of curds into cheese by treatment with salts and bacteria, which consists in treating the said pieces of curds with a mixture of bacteria, salts and compounds of the ammonium-groups as well as the amide and imide-groups, such as, for instance, amides, amines, amino-acids, albumin bodies and the waste products thereof.

2. Process according to claim 1, in which the pieces of curds are treated at a temperature of from 15 to 30° centigrade with a mixture comprising as main constituents carbonate of ammonium, lactate of ammonium and chloride of ammonium.

3. A process for quickly transforming pieces of curds into cheese by treatment with salts and bacteria in which the pieces of curds are treated with a mixture consisting of 50% amino-acids, 40% common salt, 4% chloride of magnesia, 4% of phosphate of calcium, 1% iron salts, and 1% manganese salts.

In testimony whereof I have affixed my signature.

RICHARD von der HEIDE.